Patented Oct. 12, 1948

2,451,149

UNITED STATES PATENT OFFICE 2,451,149

MANUFACTURE OF MATERIALS RESISTANT TO OR ACTIVE AGAINST MICROORGANISMS

Erich Boehm, Cardiff, Wales, assignor of one-half to Nipa Laboratories, Limited, Cardiff, Wales, a company of Great Britain and Northern Ireland No Drawing. Application November 27, 1943, Serial No. 512,062. In Great Britain November 16, 1942

5 Claims. (Cl. 167—30)

1

The present invention relates to the manufacture of materials resistant to or active against micro-organisms.

The process of this invention is applicable to the manufacture of food and provisions, technical, cosmetic and pharmaceutical preparations and for the manufacture of antiseptic and disinfecting preparations.

In accordance with this invention there is incorporated in any stage of the manufacture of material liable to micro-biological decomposition or in the base or substratum of a disinfecting or antiseptic preparation an ether of ethylene glycol (sym. — dihydroxyethane) in which one of the hydroxyl groups is etherified by an aryl radical or a mixture of such ethers or a mixture of one or more of such ethers with the monomethylether, mono-ethylether, mono-propylether or mono-butylether of ethylene glycol or mixtures of these.

These ethers possess the formulae:

in which R may be an aryl or aralkyl group. The aryl groups may be phenyl, naphthyl and similar groups and they can contain further substituents such as halogen, alkyl, aralkyl, aryl or additional hydroxy groups, or alkoxy groups. By means of them it is possible to prevent effectively the development of fungi and of many bacteria as well as the fermentation of yeast in different materials containing carbohydrates, and these ethers have also a killing effect on micro-organisms within a short time.

Amongst the ethers that may be used, mention may be made of ethylene-glycol o-, m-, p-chlorophenyl ether, ethylene-glycol 1-naphthyl ether, ethylene-glycol phenyl ether and ethylene-glycol benzyl ether.

These substances are applicable themselves or after their incorporation with inert powders, e. g. talcum, or in the form of ointments, or in solutions, or in suspensions. Furthermore, mixtures with other similarly active substances are possible.

In a charge of 0.2 gram of pressed top fermentation distillery yeast with 25 cc. of 1 percent glucose solution, the addition of 0.03 percent of ethylene-glycol-p-chlorophenyl ether or 0.05 percent of ethylene-glycol-o-chlorophenyl ether prevents all fermentation at 37° C. for 24 hours.

The satisfactory disinfecting action of the various ethers is clearly shown by determining the concentrations at which development of *Staphylococcus aureus, Bacterium coli, Bacterium*

2

*paratyphosus, Bacterium pyocyaneus, Salmonella typhae* and similar micro-organisms in a distilled water or a normal saline solution, or a nutrient medium (Suspension method) or dried on bastiste slips (Carrier method) is completely suppressed.

The following concentrations were found to be effective:

*Phenyl ether of ethylene glycol*

1.0% kills within 30 mins. *B. pyocyaneus* in distilled water (Suspension method).
1.2% kills within 5 mins. *B. coli* in distilled water (Suspension method).
1.2% kills within 5 mins. *B. coli* in ordinary nutrient broth (Suspension method).
1.2% kills within 5 mins. *Sal. typhae* in serum broth (Suspension method).
1.5% kills within 5 mins. *B. coli* in Ringer's sol. (Suspension method).
1.5% kills within 30 mins. *Staph. aureus* in distilled water (Suspension method).
1.5% kills within 5 mins. *B. paratyphosus* in distilled water (Suspension method).
1.5% kills within 5 mins. *Sal. typhae* in distilled water (Suspension method).
1.6% kills within 5 mins. *Staph. aureus* in distilled water (Suspension method).
1.6% kills within 5 mins. *B. coli* in distilled water (Suspension method).
1.6% kills within 3 mins. *Staph. aureus* dried on batiste slips in distilled water.
1.6% kills within 5 mins. *B. pyocyaneus* in N. saline sol. (Suspension method).
2.0% kills within 5 mins. *Staph. aureus* in nutrient broth (Suspension method).

*Para-chlorophenyl ether of ethylene glycol*

0.5% kills within 5 mins. *B. coli* in distilled water (Suspension method).
0.5% kills within 5 mins. *Staph. aureus* in distilled water (Suspension method).
0.5% kills within 5 mins. *B. pyocyaneus* in distilled water (Suspension method).
0.5% kills within 5 mins. *B. coli* dried on batiste slips in distilled water.
0.5% kills within 60 mins. *Staph. aureus* dried on batiste slips in distilled water.
0.5% kills within 5 mins. *B. pyocyaneus* dried on batiste slips in distilled water.

A mixture of 1% normal butyl ether of ethylene glycol and 1.5% phenyl ether kills, within 5 minutes, Staphylococcus aureus and bacterium pyocyaneus in normal saline solution (suspension method).

*Orthocresyl ether of ethylene glycol*

0.6% kills within 60 mins. *Staph. aureus* in Ringer's solution (Suspension method).
0.6% kills within 5 mins. *B. coli* in Ringer's solution (Suspension method).
0.6% kills within 5 mins. *B. pyocyaneus* in Ringer's solution (Suspension method).

The antiseptic action is increased when, instead of the individual ethers of ethylene glycol, mixtures thereof with one another, or with other glycol ethers are employed. In particular it is found that the bactericidal power of the mixed ethers, which is essential for the disinfectant action, is considerably greater than that of the individual components.

The following examples illustrate how the invention may be carried out in practice, but it is to be understood that the invention is in no way limited to the details given in these examples:

Example 1

2.5 parts by weight of monophenyl-ether of ethylene-glycol are mixed with 7.5 parts by weight of glycerol or ethyleneglycol. To this mixture 40 parts by weight of lanoline and 50 parts by weight of Vaseline (soft paraffin) are added. The ointment obtained is applicable for disinfectant purposes. Instead of the phenyl ether of ethylene glycol, the butyl, propyl or benzyl ethers, in the appropriate concentration can be used.

Example 2

2 parts by weight of mono phenyl ether of ethyleneglycol are incorporated in 98 parts by weight of a powder which is used for the manufacture of face powder. By dusting small quantities of this powder into a wet culture medium which is equally infected with bacterium pyoceaneus the development of this bacteria is completely prevented, and within a limited time the bacteria are killed.

Example 3

A mixture of 1 part by weight of mono phenyl ether of ethyleneglycol and one part by weight of mono n-butyl ether of ethyleneglycol, is added to 98 parts by weight of a solution of albumin and protects the same from any deterioration caused by micro-organisms.

Example 4

A 3% glucose-containing gelatine to which 1 percent by weight phenyl or 0.4% p-chlorophenyl mono ether of ethyleneglycol is added, is freely exposed to the infection of moulds, putrefaction bacteria and other ubiquitous micro-organisms. The gelatine (gel.) remains free from any infection.

Example 5

Ordinary sterile broth or serum broth to which 1.2% mono phenyl ether of ethyleneglycol is added and which is exposed to free infection by micro-organisms remains sterile for many weeks. Instead of the phenyl ether, 5% of the n-butyl ether or 0.5% of the p-chloro-phenyl ether can be employed.

Example 6

A mixture of 4 parts by weight of mono n-butyl ether and 1 part by weight of mono phenyl ether of ethyleneglycol is incorporated into 95 parts by weight of starch paste. This mixture is protected from putrefaction, even if it is stored in a wet chamber. If such a concentrated paste is diluted with water, even the diluted materials remain preserved for a long period.

Example 7

Two parts by weight of the mono β-naphthyl ether of ethyleneglycol are mixed with 98 parts by weight milk-sugar. This mixture kills pathogenic bacteria, for example, Streptococcus pyogenes, after a few minutes. For the same purpose a mixture of ethyleneglycol α-naphthyl ether and of ethyleneglycol β-naphthyl ether, each 0.75 part by weight, can be used, as well as a mixture of 0.5% of each of o- and p-chlorophenyl ethers of ethyleneglycol.

Example 8

A mixture of 3 parts by weight of the mono n-butyl-ether of ethyleneglycol plus one part by weight of the mono phenyl ether of ethyleneglycol, in which 0.5 part by weight of the mono p-chlorophenyl ether of ethyleneglycol is dissolved, and which is diluted with 97 parts by weight of water, is applicable for disinfectant purposes of all kinds.

Example 9

An addition of 0.5% of the mono phenylether or 0.2% of the p-chlorophenyl ether of ethyleneglycol to rubber-latex protects from moulds not only the latex but also the rubber produced as usual by coagulation of this latex.

Example 10

A solution of 2% of the mono n-butyl 2% of the phenyl- and 0.2% of the mono para-chlorophenyl ethers of ethyleneglycol in sterile water is prepared for the sterilisation and preservation of catgut.

Example 11

For the sterile keeping of instruments and apparatus a mixture of 2% of mono phenyl and 2% of the mono n-butyl ethers is applicable.

Example 12

For the rapid sterilisation of instruments, a mixture of 50% each of the mono phenyl and mono n-butyl ethers is used. The instruments are heated in this mixture for about 5 minutes at 130° C. after being mechanically cleaned.

It will be seen from the above that it requires a minimum amount of from about 0.03 to 2.5 per cent by weight of the described aryl ethers of ethylene glycol to retard or prevent micro-biological decomposition of a material impregnated therewith

What I claim and desire to secure by Letters Patent is:

1. The manufacture of materials resistant to micro-biological decomposition which comprises the mono p-chlorophenylether of ethyleneglycol in a material liable to micro-biological decomposition.

2. A material normally subject to micro-biological decomposition but made resistant to such decomposition by having incorporated therein from about 0.03 to 2.5 per cent by weight of an ether of ethylene glycol in which one of the hydroxyl groups is etherified by a chlorinated phenyl group.

3. Materials normally liable to micro-biological change but rendered resistant thereto by containing from about 0.03 to 2.5 per cent of an ether of ethyleneglycol in which one of the hydroxyl groups is etherified by an aryl radical together with a small but effective amount of a member of the group consisting of the methyl, ethyl, propyl and butyl mono-ethers of ethlyeneglycol.

4. In the manufacture of materials resistant to micro-biological decomposition, the process which comprises incorporating in a material subject to micro-biological decomposition from about 0.03 to 2.5 per cent of a mono-chlor phenyl ether of ethyleneglycol.

5 The manufacture of materials resistant to micro-biological decomposition which comprises incorporating in a material liable to microbiological decomposition a mixture of at least one ether of ethylene glycol in which one of the hydroxyl groups is etherified by an aryl radical, and a member of the group consisting of the methyl, ethyl, propyl and butyl mono-ethers of ethylene glycol, the quantity of said ethers incorporated in said material amounting to from about 0.03 to 2.5 per cent by weight.

ERICH BOEHM.

REFERENCES CITED

The following references are of record in the file of this patent:

UNITED STATES PATENTS

| Number | Name | Date |
|---|---|---|
| 1,970,578 | Schoeller et al. | Aug. 21, 1934 |
| 1,979,145 | Dehlen et al | Oct. 30, 1934 |
| 2,015,115 | Kyrides | Sept. 24, 1934 |
| 2,075,018 | Bruson | Mar. 30, 1937 |
| 2,123,186 | Epstein et al. | July 12, 1938 |
| 2,134,001 | Mills et al. | Oct. 25, 1938 |
| 2,158,959 | Coleman et al. | May 16, 1939 |
| 2,213,477 | Steindorff et al. | Sept. 3, 1940 |
| 2,255,916 | Doelling | Sept 16, 1941 |

FOREIGN PATENTS

| Number | Country | Date |
|---|---|---|
| 566,139 | Great Britain | Dec. 15, 1944 |